(12) United States Patent
Brück et al.

(10) Patent No.: US 7,131,198 B2
(45) Date of Patent: Nov. 7, 2006

(54) PROCESS AND DEVICE FOR PRODUCING METALLIC HONEYCOMB BODIES USING RADIATION HEATERS

(75) Inventors: Rolf Brück, Bergisch Gladbach (DE); Peter Hirth, Köln (DE); Katrin Konieczny, Siegburg (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 450 days.

(21) Appl. No.: 10/680,378

(22) Filed: Oct. 6, 2003

(65) Prior Publication Data
US 2004/0139607 A1 Jul. 22, 2004

Related U.S. Application Data

(63) Continuation of application No. PCT/EP02/03474, filed on Mar. 28, 2002.

(30) Foreign Application Priority Data
Apr. 6, 2001 (DE) ................. 101 17 088

(51) Int. Cl.
B21D 51/16 (2006.01)
(52) U.S. Cl. ................. 29/890; 29/525.14; 422/180
(58) Field of Classification Search ................. 29/890, 29/525.14; 422/180; 228/181
See application file for complete search history.

(56) References Cited

U.S. PATENT DOCUMENTS

| 3,412,917 A | 11/1968 | Omley |
| 4,231,508 A | 11/1980 | Wagner |
| 4,605,154 A | 8/1986 | Rhodes |
| 4,923,109 A * | 5/1990 | Cyron ................. 228/181 |
| 5,174,968 A * | 12/1992 | Whittenberger ............. 422/174 |
| 5,340,429 A | 8/1994 | Duffy et al. |
| 5,409,158 A | 4/1995 | Angel |
| 5,657,923 A * | 8/1997 | Sheller ................. 228/181 |
| 6,018,616 A | 1/2000 | Schaper |
| 6,276,595 B1 | 8/2001 | Brück |
| 2002/0116816 A1 | 8/2002 | Schaper |

FOREIGN PATENT DOCUMENTS

| DE | 2611832 | 9/1977 | |
| DE | 19725177 C1 | 10/1998 | |
| DE | 19943976 A1 | 3/2001 | |
| JP | 406039570 A * | 3/2006 | ................. 228/181 |

* cited by examiner

Primary Examiner—Marc Jimenez
(74) Attorney, Agent, or Firm—Laurence A. Greenberg; Werner H. Stemer; Ralph E. Locher

(57) ABSTRACT

A method for producing metallic honeycomb bodies contains the step of stacking and/or winding of at least partially structured metallic foils to form a honeycomb structure with channels. The metallic foils are heated using at least one radiant heater from the open front face of the channels, whereby at least one subsection of the honeycomb structure is heated to such a degree that the subsection reaches a temperature of between 800° C. and 1200° C. after 5 to 30 seconds. The metallic foils are interconnected in a subsection using a commercial jointing process. A device for producing metallic honeycomb bodies using at least one radiant heater is used in the process.

16 Claims, 2 Drawing Sheets

PROCESS AND DEVICE FOR PRODUCING METALLIC HONEYCOMB BODIES USING RADIATION HEATERS

CROSS-REFERENCE TO RELATED APPLICATION

This application is a continuation of copending International Application No. PCT/EP02/03474, filed Mar. 28, 2002, which designated the United States and was not published in English.

BACKGROUND OF THE INVENTION

FIELD OF THE INVENTION

The present invention relates to a process for producing metallic honeycomb bodies in which at least partially structured metal foils are stacked and/or wound in order to form a honeycomb structure with passages running approximately parallel to an axis. The metal foils are at least partially inserted into a tubular jacket and are connected to one another by joining at least in partial regions. The invention also describes a device for producing metallic honeycomb bodies which is suitable in particular for carrying out the process. Metallic honeycomb bodies of this type are used, for example, as catalyst support bodies for purification of an exhaust gas from an internal combustion engine.

Known honeycomb bodies, in particular metallic catalyst support bodies, have a honeycomb structure with thin-walled, smooth and/or corrugated sheet-metal foils which are wound, for example, in a spiral or S shape and are connected to one another in a circle-cylindrical or oval-cylindrical tubular jacket by joining techniques such as welding, soldering, sintering, adhesive bonding or the like.

To increase the ability of a honeycomb body of this type to withstand fluctuating thermal loads, it is already known for the sheet-metal foils of the honeycomb structure to be connected to one another and if appropriate also to the tubular jacket by joining only in certain partial regions, for example at the end sides, so that in the event of a thermal load occurring the tubular jacket and the honeycomb structure have unimpeded expansion options. This results in that fluctuating plastic deformations of the honeycomb structure, causing destruction and detachment of the honeycomb structure, are avoided.

Furthermore, processes for connecting a honeycomb structure disposed in a tubular jacket by joining at the end sides in which the connection by joining is carried out in a discontinuous process that lasts a few hours in a high-temperature furnace are known. The individual honeycomb bodies are in this case grouped into batches and then introduced into the furnace. To avoid chemical reactions, such as for example the undesirable formation of crystals or oxidation in particular at the surface of the sheet-metal foils, the joining process in the furnace takes place under vacuum conditions or under a shielding gas atmosphere containing, for example, argon and/or hydrogen. This entails in particular a relatively high outlay on apparatus and correspondingly high costs.

Furthermore, continuous processes that use induction coils during the connection of the sheet-metal foils by joining are known. The induction coils serve the purpose of heating at least partial regions, in which the sheet-metal foils are ultimately to be connected by joining, so that, by way of example, a solder disposed in the partial regions begins to flow and after cooling produces a connection of this nature. Depending on the type of connection by joining, the induction coils have to be operated at different AC voltage frequencies and have to be brought relatively close to the corresponding partial regions of the honeycomb body. This may lead to non-uniform formation of connections by joining in the respective partial regions.

SUMMARY OF THE INVENTION

It is accordingly an object of the invention to provide a process and a device for producing metallic honeycomb bodies using radiation heaters that overcome the above-mentioned disadvantages of the prior art methods and devices of this general type, which is particularly suitable for continuous production, with the quality of the connections by joining which are to be produced being improved.

The process according to the invention for producing metallic honeycomb bodies includes stacking and/or winding of at least partially structured metal foils to form a honeycomb structure with passages. The metal foils are heated with the aid of at least one radiation heater from the open-end face of the passages. The honeycomb structure, at least in a partial region, being heated in such a way that the at least one partial region has reached a temperature of 800° C. to 1200° C. within a time of 5 s to 30 s. The metal foils are connected to one another by joining in the at least one partial region.

Tests have shown that it is particularly advantageous for the partial regions to be heated up within a time of preferably less than 10 seconds, in particular to a temperature of approximately 1050° C. On account of the short heating time to these high temperatures and targeted heating of predeterminable partial regions, the invention provides a very efficient, energy-saving method. This also has the advantage that the proposed process is particularly suitable for the series production or mass production of metallic honeycomb bodies.

Furthermore, it is proposed that radiation heaters which generate a targeted infrared heating radiation, with a clear temperature drop being produced near the outside of the at least one partial region, are used to heat the honeycomb structure. The spatially very limited introduction of heat on account of the substantially parallel infrared heating radiation leads to a very uniformly distributed thermal energy and therefore to a very uniform formation of connections within the heated partial regions. Consequently, the process according to the invention produces metallic honeycomb bodies that have high-quality connections produced between the metal foils by joining, with the heating process only taking a short time.

According to a further configuration of the process, the honeycomb structure has passages running approximately parallel to an axis, the heating radiation being directed onto an end side of the honeycomb structure in such a manner that the honeycomb structure is heated only in partial regions with an axial depth which is less than the axial length of the passages. This allows the production of honeycomb bodies whose metal foils, by way of example, are only connected to one another near the end side, with in particular a thermally induced compensating expansion of the metal foils with respect to one another being ensured. In this context, the term end side refers to the surface in which the end faces of the passages are substantially disposed.

The metal foils, before being heated, are at least partially introduced into a tubular jacket, and are connected to one another by joining. The metal foils are then inserted completely into the tubular jacket and a number of the metal foils are connected to the tubular jacket by joining. In this case, by way of example, it is possible to use different radiation heaters, with a relatively homogeneous distribution of the heat capacity in the partial regions being ensured at least while the metal foils are being connected to one another. Therefore a somewhat lower-energy radiation heater can be used for this connection than is subsequently used when generating the connection between the tubular jacket and the honeycomb structure.

According to a further configuration of the process, prior to the heating operation the metal foils are introduced completely into the tubular jacket, with the tubular jacket preferably projecting beyond the end sides of the honeycomb structure. This has the advantage that the metal foils no longer have to be moved relative to the tubular jacket after the connections by joining have been formed.

According to yet a further configuration of the process, the metal foils, before being heated, are disposed on the outside of an inner tube in such a way that the metal foils form passages running substantially transversely with respect to the inner tube, with a number of metal foils being connected to the inner tube by joining. This also, by way of example, gives a process for producing honeycomb bodies through which gases can flow in the radial direction, wherein the inner tube in particular has openings through which a gas which flows centrally into the inner tube flows out into the radially outwardly directed passage or vice versa.

It is particularly advantageous for adjacent sections of the tubular jacket and/or of the inner tube to be heated simultaneously, if appropriate with the aid of inductively acting heating. In this way, it is also possible to produce a connection by joining between a number of metal foils and the tubular jacket or the inner tube. The result of this is that the production of connections by joining between the individual metal foils and also between metal foils and the tubular jacket or inner tube takes place in a single process step, which in particular reduces production time. However, in this case it should be born in mind that the heating times required to reach a certain temperature may be lengthened if the tubular jacket or the inner tube is also to be heated.

The reason for this lies in particular in the different heat capacities of the metal foils and the tubular jacket or inner tube.

According to yet a further configuration of the process, the at least one end side of the honeycomb structure is completely heated to a predeterminable depth. This leads to a complete, end-side connection of metal foils, preventing, for example, ends of the metal foils disposed at the end sides from being excited to vibrate as a result of pressure fluctuations occurring in an exhaust-gas stream, since such vibrations could cause adjacent connections formed by joining to become detached under long-term mechanical load. Accordingly, the formation of connections between the individual metal foils by joining over the entire end side of the honeycomb structure increases, for example, the service life of a honeycomb body that is used as a catalyst support body in an exhaust system.

If the honeycomb structure has passages running approximately parallel to an axis, according to a further configuration of the process the depth of the heated partial regions is varied, the heating in partial regions of the honeycomb structure which are disposed on the radially outer side reaching a greater depth than in partial regions which are disposed on the radially inner side. Of course, with a view to achieving a configuration of a honeycomb body through which gas can flow in the radial direction, a correspondingly varying depth in the axial direction and/or circumferential direction of the honeycomb body is also possible. In this way, it is possible, for example, for a more stable connection to be produced between the honeycomb body and the tubular jacket or inner tube than the connections between the individual metal foils formed by joining.

According to a further configuration of the process, the heating radiation impinges on the end side of the honeycomb structure at an angle of between 10° and 80°. The angle selected in this respect has effects on the depth to which the honeycomb structure is heated. In the case of angles smaller than 10°, the heating radiation extends to a relatively large partial region of the end side. The result of this is that the thermal energy produced by the radiation heater is distributed over larger partial regions, thus reducing the amount of energy introduced per unit surface area and slowing the heating process. Angles larger than 80° should likewise be avoided, since in this case a large proportion of the heating radiation or thermal energy passes directly through the honeycomb structure and cannot be utilized to heat the metal foils. Furthermore, when selecting the angle the external shape of the end side should be taken into account. For example, if the end side is a telescopic configuration of metal foils, in which adjacent metal foils are disposed partially offset with respect to one another, by way of example, depending on the nature of the telescopic configuration, relatively large or relatively small angles should be used, while in the case of a substantially planar end side angles in a range from 30° to 60° are preferred.

According to yet a further configuration of the process, the honeycomb body is moved relative to the at least one radiation heater during the heating operation. The result of this is that if appropriate even large partial regions of the honeycomb structure, in particular the entire end side of the honeycomb structure, are heated with the aid of a radiation heater which emits a spatially limited heating radiation. According to a process variant, it is proposed for the radiation heater to execute a relative rotational movement about the axis of the honeycomb body, which likewise ensures large-area, uniform heating of the honeycomb structure.

It is preferable for the relative movement between the honeycomb body and the radiation heater to be generated by virtue of the honeycomb body rotating about its axis and/or the angle between the radiation axis of the radiation heater and the axis of the honeycomb body being varied. This ensures that the heating radiation penetrates the desired depth into the honeycomb structure, irrespective of whether the partial regions that are to be heated are located close to a projecting tubular jacket or in centrally disposed partial regions of the end side.

According to yet a further configuration of the process, the connections by joining are produced by soldering, sintering and/or diffusion welding. In this case, it is particularly advantageous, prior to the heating operation used to form the connections by joining, for solder, diffusion promoter or the like to be disposed in the partial regions. It is preferable to form connections by joining using the soldering technique, in which case solder is disposed in the partial regions prior to the heating operation. This keeps the temperatures required to form the connection by joining relatively low while allowing relatively short cycle times for forming the connections to be maintained.

If particularly high temperatures (in particular higher than 1,000° C.) occur during production of the connection by joining, it is advantageous for the connections to be produced under shielding gas. Known shielding gases, in particular with an argon content, are suitable for this purpose.

A further aspect of the invention proposes a device for producing metallic honeycomb bodies, in particular for carrying out the process according to the invention. The device contains a positioning surface for positioning a honeycomb body during a heating operation and at least one radiation heater having a radiation axis. The device is distinguished by the fact that the positioning surface and the radiation axis of the radiation heater include an angle of from 10° to 80°. In this case, the radiation heater is in particular configured in such a way that it emits radiation at an angle of 10° to 80° with respect to the end side of a honeycomb body fixed on the positioning surface. The radiation heater allows rapid heating of partial regions of the honeycomb body in order to form connections by joining.

To ensure that partial regions of the honeycomb body are heated as uniformly as possible, the positioning surface is preferably pivotable, so that the angle is adjustable, in particular during the heating operation. This can likewise be achieved by a further configuration of the device in which the at least one infrared radiation heater is pivotable.

According to yet a further configuration of the device, the distance between the positioning surface and the at least one infrared radiation heater is variable. In this context, it is particularly advantageous for the at least one infrared radiation heater to be moveable on predeterminable paths relative to the positioning surface. In this way it is possible, for example, to ensure that the connections by joining are generated over a varying depth in different partial regions of the heated end side. With a view to superimposing a plurality of relative movements of the honeycomb body and the infrared radiation heater, it is particularly advantageous for these movements to be adapted to one another, in particular by the individual movements being recorded by metrology and/or coordinated by a common, preferably computer-controlled control unit.

According to yet a further configuration of the device, the positioning surface has a holding device for fixing the honeycomb body. This ensures that a desired positioning of the honeycomb body with respect to the infrared radiation heater is maintained. A holding device of this type is important in particular if the positioning surface is part of a conveyor belt. A conveyor belt of this type makes it possible to produce metallic honeycomb bodies in a continuous process, which is particularly suitable in view of the short heating times of the honeycomb body achieved by the infrared radiation heaters.

According to a further configuration, the device has mirrors for diverting and/or reflecting the heating radiation. Therefore, parts of the heating radiation that have already been reflected by the metal foils are used again. Accordingly, the use of mirrors of this type leads to improved utilization of the heating radiation generated by the infrared radiation heaters. However, it is also possible for radiation to be emitted directly onto the mirrors and in this way diverted onto the partial regions which are to be heated, in which case, by way of example, it is possible to "bypass" projections or shoulders which project into the direct radiation axis in the vicinity of the end side of the honeycomb body.

If the connections by joining are produced at very high temperatures., the device generates a local shielding gas atmosphere, via a housing. In this case, the housing surrounds at least sections close to the partial region of the honeycomb body, which is heated with the aid of the infrared radiation heaters, the intention being to avoid impeding the direct heating radiation.

Other features which are considered as characteristic for the invention are set forth in the appended claims.

Although the invention is illustrated and described herein as embodied in a process and a device for producing metallic honeycomb bodies using radiation heaters, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
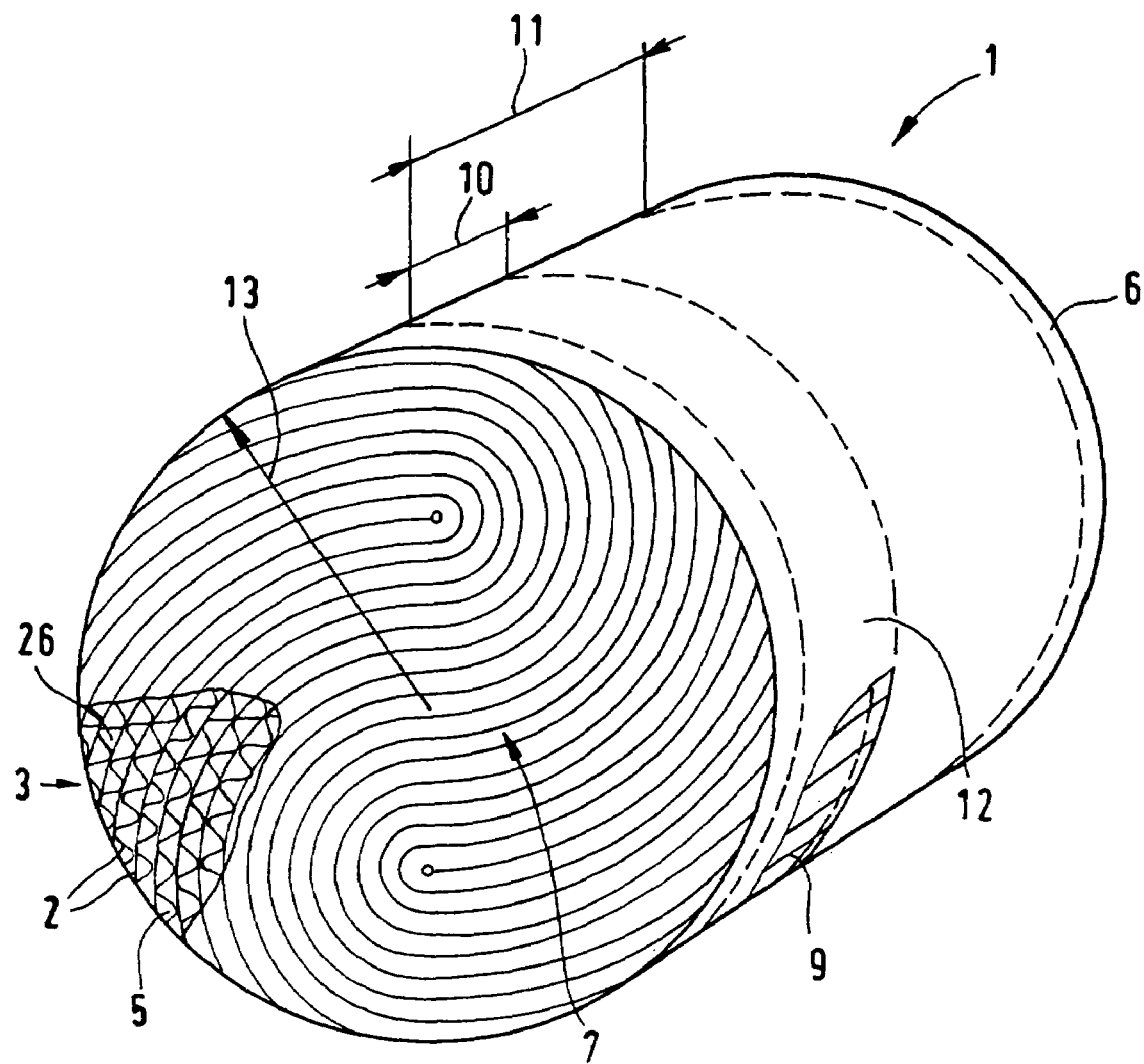
FIG. 1 is a diagrammatic, perspective view of an embodiment of a honeycomb body that has been produced.

Referring now to the figures of the drawing in detail and first, particularly, to FIG. 1 thereof, there is shown a diagrammatic and perspective illustration of a metallic honeycomb body 1 with stacked metal foils 2 wound in an S shape. The honeycomb body 1 has passages 5 that are formed by smooth and corrugated metal foils 2. The passages 5 and the metal foils 2 form a corresponding honeycomb structure 3. The honeycomb structure 3 is surrounded by a tubular jacket 6 that projects beyond end sides 7 of the honeycomb body 1. The individual, open-end faces 26 of the passages 5 are in this case disposed substantially in planar end sides 7 of the honeycomb body 1.

Production of the metallic honeycomb body 1 illustrated contains, for example, the now described steps.

At least partially structured metal foils are stacked and then wound them in an S shape to form the honeycomb structure 3 with the passages 5 running approximately parallel to an axis 4. The metal foils 2 are then completely inserted into the tubular jacket 6, with the tubular jacket projecting beyond the end sides 7 of the honeycomb structure 3. An end side 7 of the honeycomb structure 3 is completely heated with the aid of at least one radiation heater 8. The heating radiation being directed onto the open end faces 26 of the passages 5 in such a manner that the honeycomb structure 3 is heated in a partial region 9 with an axial depth 10 (which is less than the axial length 11 of the passages 5) in such a way that the partial region 9 has reached a temperature of 800° C. to 1200° C. after just 5 to 30 seconds, and preferably after 10 seconds. The metal foils are connected to one another by joining, and the radially 13 outer regions of the metal foils 2 are connected to the tubular jacket 6 by joining, the connections by joining being effected by soldering.

Figure 2:
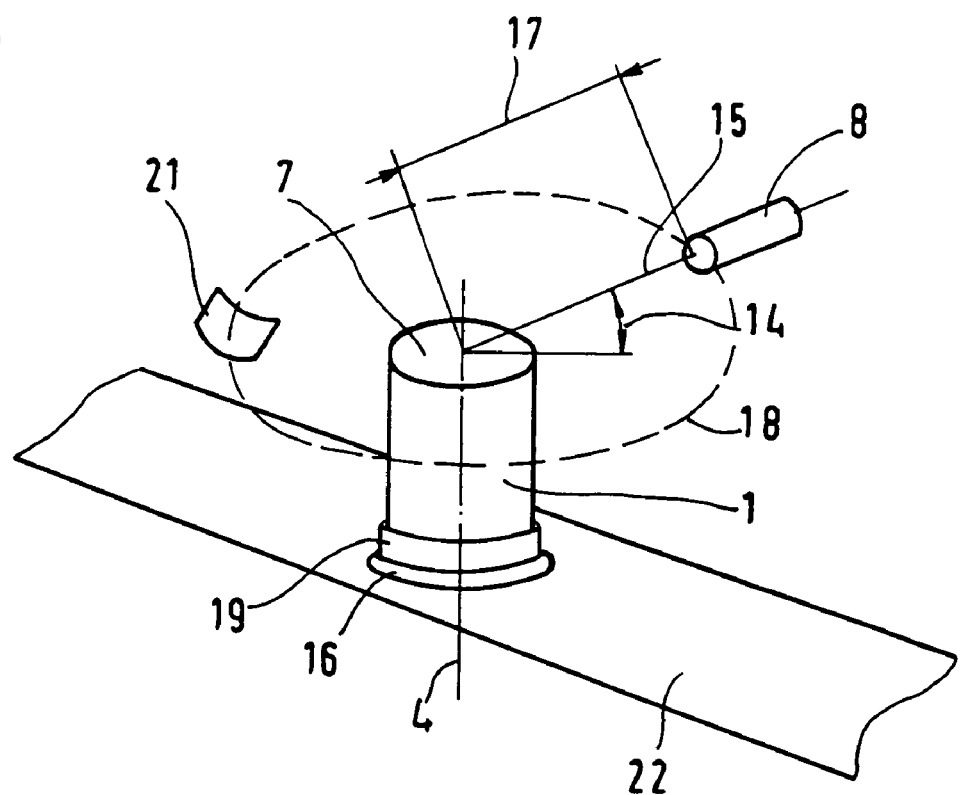
FIG. 2 is a perspective view of a first embodiment of a device according to the invention.

FIG. 2 shows a diagrammatic, perspective illustration of a first embodiment of a device according to the invention for producing the metallic honeycomb bodies 1. The device has a positioning surface 16 for positioning a honeycomb body 1 during a heating operation and an infrared radiation heater 8 with a radiation axis 15. The radiation axis 15 and the end side 7 of the honeycomb body 1, which is approximately parallel to the positioning surface 16, are at an angle 14 of 10° to 80° with respect to each other. The honeycomb body 1 is in this case fixed by a holding device 19. A distance 17 from the infrared radiation heater 8 to a point of incidence of the heating radiation on the end side 7 of the honeycomb body 1 is to be selected in such a way that it is ensured that the honeycomb structure 3 is heated to the predetermined depth 10 as quickly as possible.

In this case, it is particularly advantageous for the infrared radiation heater 8 to be moved on a path 18 relative to the honeycomb body 1, with the angle 14 preferably being varied. The path 18 is illustrated in the form of a circle, but it is possible to generate any desired path 18, in particular using a computer-controlled movement. For improved utilization of the heating radiation, the device has a mirror 21 that throws any reflected heating radiation back onto the honeycomb structure 3. Since this allows very rapid heating of partial regions of the honeycomb body 1, it is recommended for the formation of connections by joining in this way to be carried out as a continuous process. The positioning surface 16 in this case represents a section of a conveyor belt 22.

Figure 3:
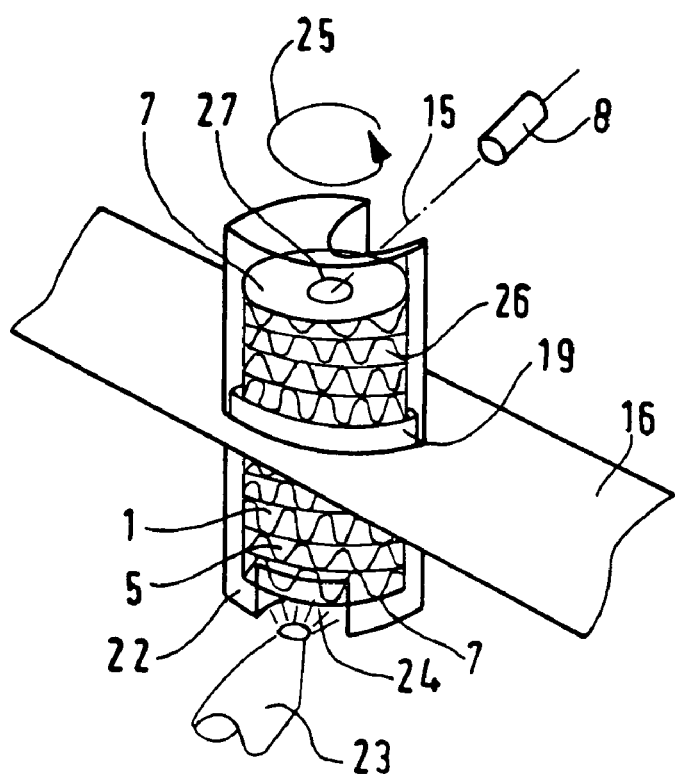
FIG. 3 is a perspective, partially cut-away view of a second embodiment of the device according to the invention.

FIG. 3 shows a second embodiment of the device according to the invention, for producing the metallic honeycomb body 1 through which gas can flow in the radial direction. The honeycomb body 1 in this case has a plurality of layers of the structured and smooth metal foils 2 which form the passages 5 which run substantially transversely with respect to a centrally disposed inner tube 27, or radially outward. The honeycomb body 1 is fixed relative to the positioning surface 16 using the holding device 19, extending through the positioning surface 16. The honeycomb body 1 is surrounded by a housing 22, which is used in particular to form a shielding gas atmosphere in the interior. For this purpose, by use of a nozzle 23, by way of example argon-containing shielding gas is fed from the end side 7 of the honeycomb body 1 into the interior of the central inner tube 27 and emerges again from the open end faces 26 of the passages 5, the connections by joining being produced in a shielding gas atmosphere using the infrared radiation heater 8. For this purpose, the housing has openings 24 which ensure unimpeded heating of the honeycomb structure 3 along the radiation axis 15. In this context, arrow 25 indicates that the honeycomb body 1, by way of example, rotates during the heating operation, with the radiation heater 8 preferably emitting radiation onto the end side 7 of the honeycomb body 1 at different angles 14 within a range from 10° to 80°. This ensures uniform heating and therefore also a high-quality connection by joining. Furthermore, the embodiment illustrated offers the option of simultaneous heating of both end sides 7 of the honeycomb body 1 on both sides. This could further reduce production times for a metallic honeycomb body 1 of this type.

We claim:

1. A process for producing metallic honeycomb bodies, which comprises the steps of:
    performing at least one of stacking of and winding of at least partially structured metal foils for forming a honeycomb structure having passages defined therein;
    heating the metal foils using at least one radiation heater from an open end face of the passages, the radiation heater generating a targeted infrared heating radiation and the honeycomb structure, at least in at least one partial region, reaching a temperature of 800° to 1200° C. within a time of 5 to 10 seconds during the heating step; and
    connecting the metal foils to one another by joining in the partial region.

2. The process according to claim 1, which further comprises:
    forming the passages of the honeycomb structure to run substantially parallel to an axis of the honeycomb structure; and
    directing heating radiation onto an end side of the honeycomb structure for heating the honeycomb structure only in the partial region to an axial depth which is less than an axial length of the passages.

3. The process according to claim 1, which further comprises:
    introducing the metal foils at least partially into a tubular jacket before performing the heating step;
    connecting the metal foils to one another by joining;
    inserting the metal foils completely into the tubular jacket; and
    connecting a number of the metal foils to the tubular jacket by joining.

4. The process according to claim 3, which further comprises introducing the metal foils completely into the tubular jacket, with the tubular jacket projecting beyond end sides of the honeycomb structure.

5. The process according to claim 3, which further comprises disposing the metal foils, before being heated, on an outside of an inner tube and forming the metal foils to form the passages running substantially transversely with respect to the inner tube, with a number of the metal foils being connected to the inner tube by joining.

6. The process according to claim 5, which further comprises heating inductively one of sections of the tubular jacket and of the inner tube that adjoin the partial region of the honeycomb structure.

7. The process according to claim 1, which further comprises completely heating at least one end side of the honeycomb structure to a predeterminable depth.

8. The process according to claim 1, which further comprises;
    forming the passages of the honeycomb structure to run substantially parallel to an axis of the honeycomb structure; and
    varying a heating depth of the partial region, a heating in the partial region of the honeycomb structure disposed on a radially outer side reaching a greater depth than a heating of the partial region disposed on a radially inner side.

9. The process according to claim 1, which further comprises impinging heating radiation on a end side at an angle of between 10° and 80°.

10. The process according to claim 1, which further comprises moving the honeycomb structure relative to the radiation heater during the heating step.

11. The process according to claim 10, which further comprises forcing the radiation heater to undergo a relative rotational movement about an axis of the honeycomb structure.

12. The process according to claim 10, which further comprises rotating the honeycomb structure about the axis.

13. The process according to claim 10, which further comprises varying an angle between a radiation axis of radiation heat produced by the radiation heater and the axis of the honeycomb structure.

14. The process according to claim 1, which further comprises producing connections by joining by at least one of soldering, sintering, and diffusion welding.

15. The process according to claim 14, which further comprises disposing one of a solder and a diffusion promoter in the partial region prior to the heating step used to form the connections by joining.

16. The process according to claim 14, which further comprises producing the connections by joining under a shielding gas.

* * * * *